US011560976B2

(12) United States Patent
Turner

(10) Patent No.: US 11,560,976 B2
(45) Date of Patent: Jan. 24, 2023

(54) HYDRAULIC HOSE REPAIR CLAMP

(71) Applicant: Hosepatch Pty Ltd, Wickepin (AU)

(72) Inventor: Chris Turner, Wickepin (AU)

(73) Assignee: Hosepatch Pty Ltd, Wickepin (AU)

( * ) Notice: Subject to any disclaimer, the term of this patent is extended or adjusted under 35 U.S.C. 154(b) by 590 days.

(21) Appl. No.: 16/483,712

(22) PCT Filed: Feb. 7, 2018

(86) PCT No.: PCT/AU2018/050092
§ 371 (c)(1),
(2) Date: Aug. 5, 2019

(87) PCT Pub. No.: WO2018/145155
PCT Pub. Date: Aug. 16, 2018

(65) Prior Publication Data
US 2020/0025323 A1    Jan. 23, 2020

(30) Foreign Application Priority Data
Feb. 8, 2017    (AU) ................................ 2017900389

(51) Int. Cl.
*F16L 55/172*    (2006.01)
*F16L 33/23*    (2006.01)

(52) U.S. Cl.
CPC ............. *F16L 55/172* (2013.01); *F16L 33/23* (2013.01)

(58) Field of Classification Search
CPC ......... F16L 33/23; F16L 55/17; F16L 55/172; F16L 55/1725

USPC ................................... 138/99; 285/373, 419
See application file for complete search history.

(56) References Cited

U.S. PATENT DOCUMENTS

| 255,465 | A | * | 3/1882 | Shepherd | F16L 55/172 |
| | | | | | 138/99 |
| 654,040 | A | | 7/1900 | Wilkins | |
| 3,599,995 | A | | 8/1971 | Rafalski | |
| 4,064,614 | A | * | 12/1977 | Horvath | B21C 37/28 |
| | | | | | 29/890.144 |
| 4,768,813 | A | | 9/1988 | Timmons | |
| 5,358,283 | A | * | 10/1994 | Silva | F16L 21/06 |
| | | | | | 285/24 |
| 5,772,253 | A | * | 6/1998 | Hodge | F16L 17/04 |
| | | | | | 285/15 |
| 2002/0033604 | A1 | * | 3/2002 | Minemyer | F16L 47/06 |
| | | | | | 285/373 |

(Continued)

FOREIGN PATENT DOCUMENTS

| GB | 1523882 | A | * | 9/1978 | ............. | F16L 41/12 |
| GB | 2191837 | A | | 12/1987 | | |
| WO | WO2000046537 | A1 | | 8/2000 | | |

(Continued)

*Primary Examiner* — Kenneth Rinehart
*Assistant Examiner* — Richard K. Durden
(74) *Attorney, Agent, or Firm* — Todd Martin

(57) ABSTRACT

A hose repair system including a first clamping member and a second clamping member, each clamping member including an interior surface with a concave curve along the width and a pair of longitudinal grooves formed at the intersection of the first and second clamping members. Each longitudinal groove extends from end to end of each clamping member. The system also includes at least one fastener for clamping the first and second clamping members together.

17 Claims, 17 Drawing Sheets

(56) References Cited

U.S. PATENT DOCUMENTS

2012/0216901 A1* 8/2012 Dickinson ........... F16L 55/1715
                                                     138/99
2012/0274061 A1   11/2012 Wilkinson

FOREIGN PATENT DOCUMENTS

WO    WO2008065364 A1    6/2008
WO    WO-2015050428 A1 * 4/2015 ............ F16L 55/172

* cited by examiner

SECTION B-B

HYDRAULIC HOSE REPAIR CLAMP

TECHNICAL FIELD

The present disclosure relates to improvements in devices designed to repair hydraulic hose failures like leakages. In particular, although not exclusively, the repair clamp is suitable to fix a leaking hydraulic hose. Various embodiments of a hose repair system and a method for repairing the hose are described herein.

BACKGROUND

When a hydraulic hose fails, it either has to be replaced or repaired. Both repairing and replacing the hose may cause a downtime of the system. The downtime may be in a range of several hours to several days depending on the availability of the services or the replacement stock. In certain circumstances an extended downtime may be an issue.

SUMMARY

In general, this document describes in a first aspect a hose repair system that includes a first clamping member and a second clamping member, each of the first and second clamping members including a first end and a second end opposite the first end. Each clamping member has a length from the first end to the second end, a width transverse to the length, an exterior surface from the first end to the second end, an interior surface from the first end to the second end. The interior surface includes a concave curve along the width, the concave curves of the first and second clamping members forming a channel along the lengths of the first and second clamping members when the clamping members are clamped together. The channel includes a pair of longitudinal grooves formed at the intersection of the first and second clamping members. Each longitudinal groove extends from end to end of each clamping member. Each longitudinal groove has opposed wall portions extending into the channel and at least one fastener for clamping the first and second clamping member together.

In a second aspect, the hose repair system may include wall portions of each longitudinal groove that are continuous along the entire length of each clamping member. In a third aspect, accordingly to the first or second aspect the interior surface of each clamping member includes a plurality of ribs, each rib being oriented transverse to the length of each clamping member.

In a forth aspect the wall portions and said ribs each have a height, the height of the wall portions being greater than the height of the ribs.

In a fifth aspect, accordingly to either aspect 3 or 4 the ribs of the first clamping member are co-planar with the ribs of the second clamping member, the co-planar ribs is interrupted by each longitudinal groove in a plan transverse to the length of each clamping member.

In a sixth aspect, each clamping member includes an abutment surface on both sides of the concave surface. This abutment surfaces of the first and second clamping members is configured to abut one another when the first and second clamping surfaces are clamped together.

In a seventh aspect, the longitudinal grooves are directly opposite one another in a plane transverse to the length of the clamping members.

In an eighth aspect, the wall portions forming the longitudinal grooves extend into the interior wall portion and form sharp edges with the ribs.

In a ninth aspect, the at least one fastener includes a plurality of bolts.

In a tenth aspect, the at least one fastener includes a resilient clamp configured to slide over the exterior surfaces of the first and second clamping members to bias the first and second clamping members towards one another.

In an eleventh aspect where on the exterior surface the at least one fastener includes a plurality of recesses along the convex surface provides access to the plurality of bolts.

In a twelfth aspect, the first and second clamping members are metallic.

In a thirteenth aspect, the system consists of a metal.

In a fourteenth aspect, the longitudinal channel is the only channel extending along the length of the first and second clamping members when the first and second clamping members are clamped together.

In a fifteenth aspect, the hose repair system further comprises a barb projecting from at least one of the interior surfaces. The barb is configured to partially penetrate a surface of a hose clamped by the first and second clamping surfaces.

In a sixteenth aspect, according to a method for assembling the hose repair system a first clamping member receives a hose within a concave channel, then positioning a second clamping member above the hose opposite to the first clamping member, then at least one fastener biases the first and second clamping members towards one another, wherein biasing the first and second clamping member forms a pair of longitudinal grooves at the intersection of the first and second clamping members, each longitudinal groove extending from end to end of each clamping member, and each longitudinal groove having opposed wall portions extending into the channel.

In a seventeenth aspect, according to the method, the one fastener biases said clamping members with a plurality of bolts.

In an eighteenth aspect, the plurality of bolts is screwed for biasing the clamping members.

In a nineteenth aspect, the method includes various methods for screwing the bolts.

In a twentieth aspect, the at least one fastener has a resilient clamp sliding over the exterior surfaces of the first and second clamping members biasing the first and second clamping members towards one another.

The system and techniques described here may provide one or more of the following advantages. First, in cases where no replacement hoses are immediately available a downtime caused by a damaged or leaking hoses may be reduced considerably. The system may be operable after a short time, (the time necessary to mount the hose repair system).

Hydraulic hoses are used in a variety of appliances and domains. As an example, air conditioners, heating units, or a variety of industrial vehicles may use hydraulic hoses. Hydraulic hoses are exposed to internal pressure forces while conducting fluids. Material constraints, damage, or aging may be the origin of hose failures. If a failure may occur and the hose must be fixed or exchanged, it usually is related to a downtime of the system. This may have a considerable impact depending on the circumstances and the use of the hydraulic hose. In certain cases, the replacement of the hose can take up to several days. This could be the case if parts must be sent to rural areas. Moreover, if industrial used units are involved, the impact of a downtime can be challenging and may have a high impact. Production chains may have to be interrupted until the hose is repaired or replaced. In these circumstances, an intermediate solution to reduce the downtime involved with a hose failure to a minimum of time is advantageous. This is particularly true if it is a hose is of a special type, and not in stock at a local supplier. In these cases, the downtime may last for an extended period. Thus, a solution to maintain the system working until a retail part arrives or service provider is available, is advantageous.

Another advantageous aspect is the possibility to change the length of a present hose by extending it with a second one or shorten the length of a given hose. A specific length of hose that is desired may not be available. In this situation, the hose repair system may provide a solution for extending or shortening the hose length according to individual requirements.

The details of one or more implementations are set forth in the accompanying drawings and the description below. Other features and advantages will be apparent from the description and drawings, and from the claims.

DETAILED DESCRIPTION OF EMBODIMENTS

Figure 1:
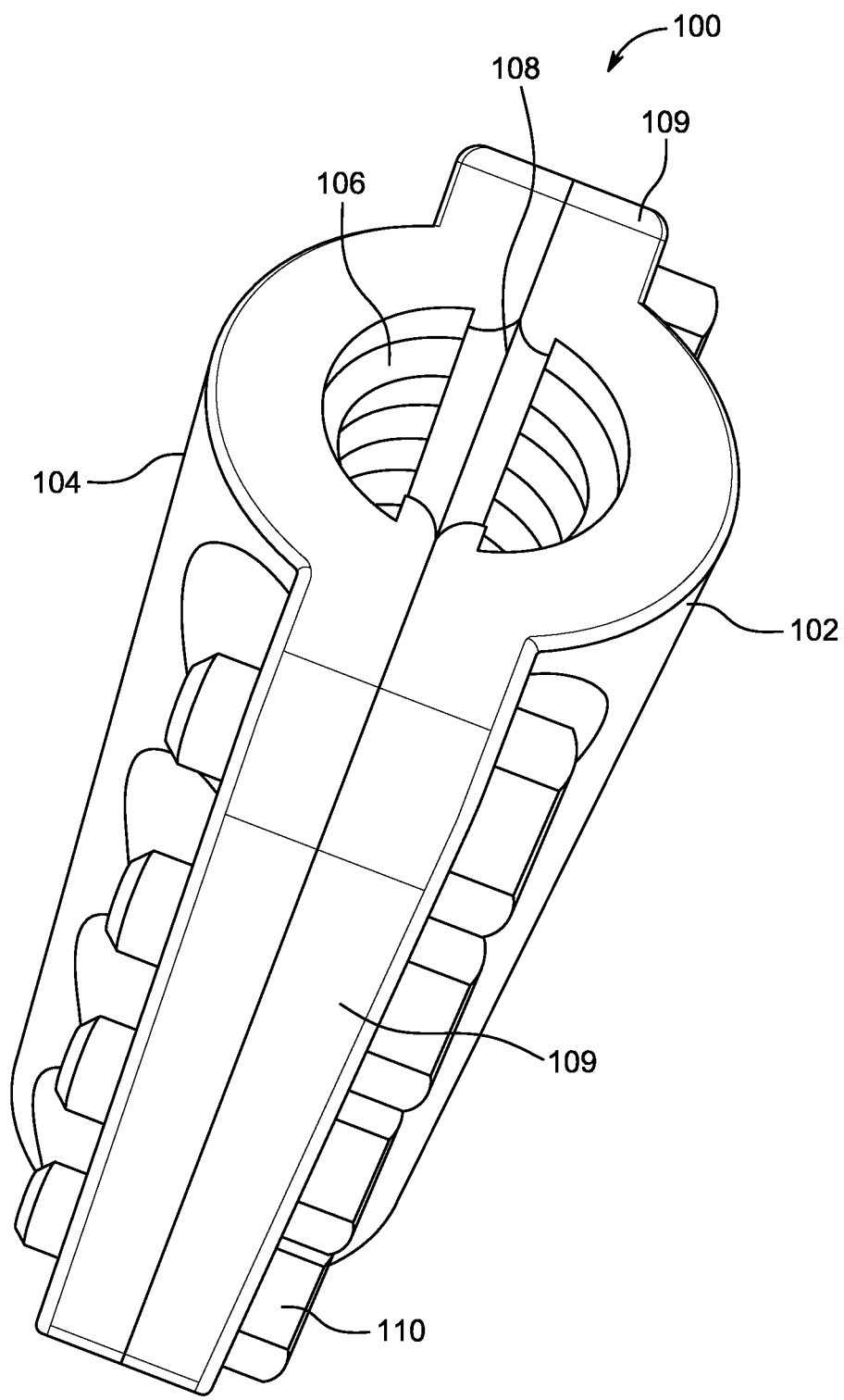
FIG. 1 is a perspective view of a hose repair system having an upper clamping member and a lower clamping member in a clamped orientation in accordance with one aspect of the present disclosure.
Figure 2:
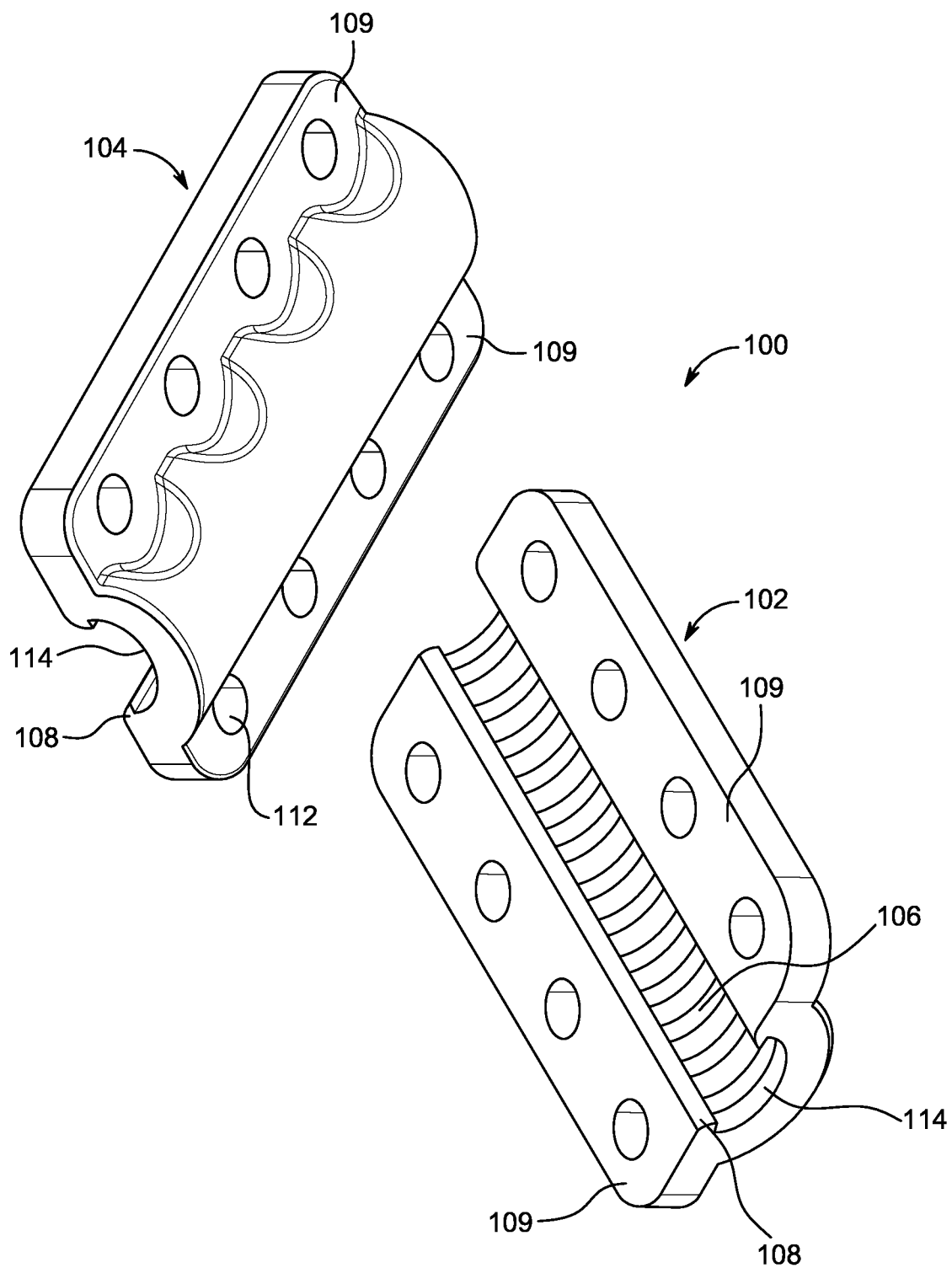
FIG. 2 is a perspective view of upper and lower clamping members of FIG. 1 in a disengaged orientation.

FIGS. 1 to 7 show an exemplary embodiment of a hose repair system 100 having a first, upper clamping member 102, a second, lower clamping member 104, and at least one fastening member 110. In use, both clamping members are positioned and fitted round a hose 10 and biased together by fastening means such as fasteners 110 to clamp and seal the hose, or join together two hose portions or pieces.

Figure 8:
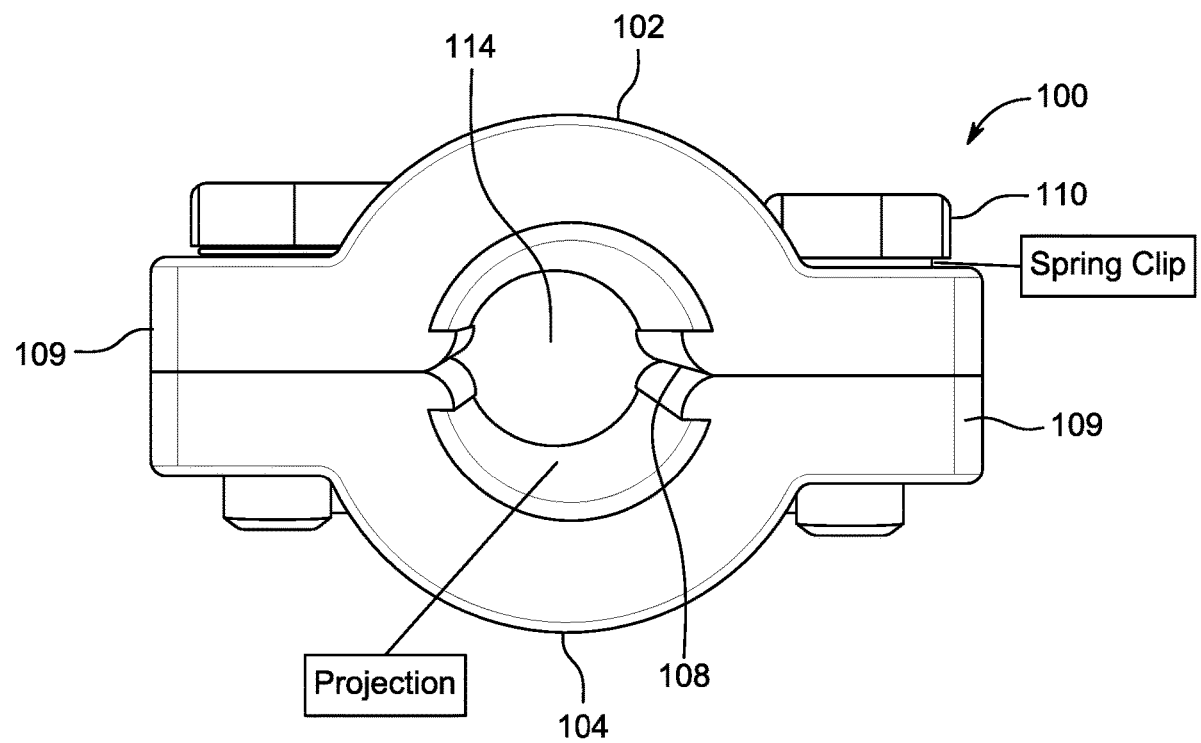
FIG. 8 is an end view of the hose repair system of FIG. 1.
Figure 9:
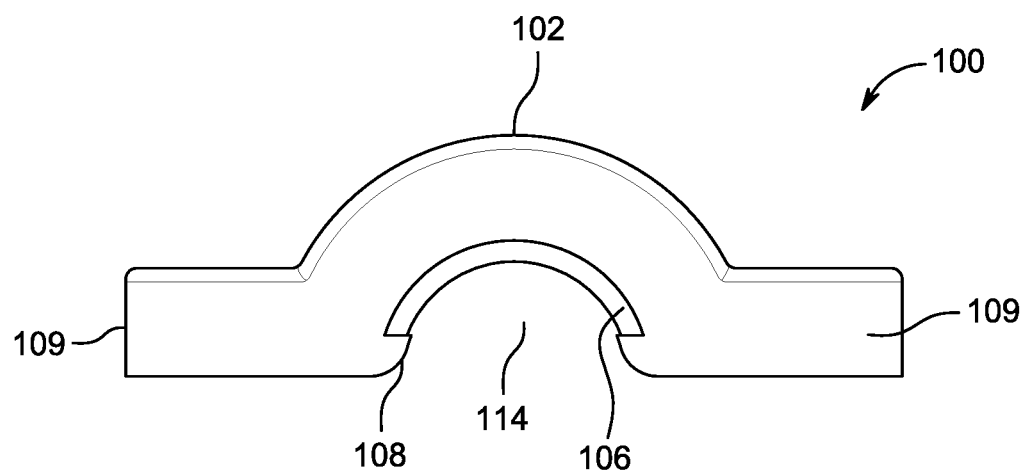
FIG. 9 is an end view of the upper clamping member of FIG. 1.
Figure 10:
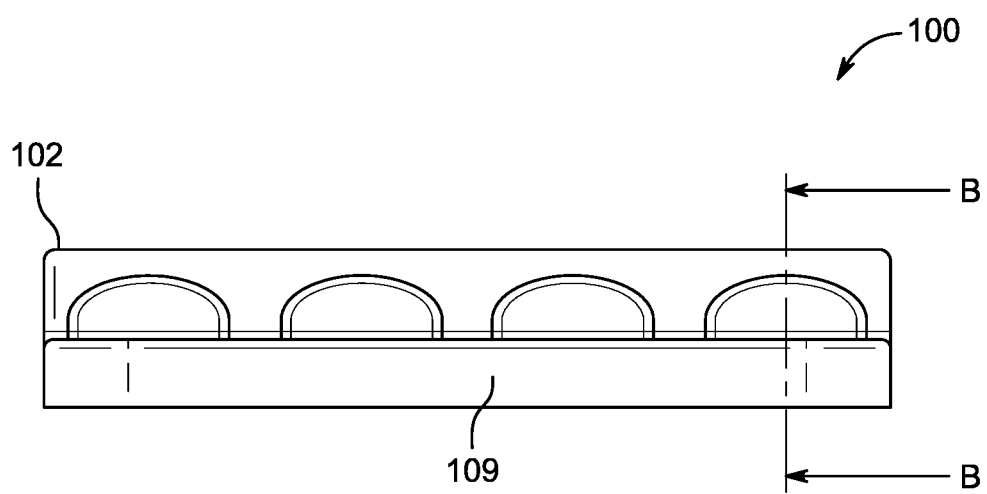
FIG. 10 is a side view of the upper clamping member of FIG. 1.

FIG. 1 generally depicts hose repair system 100 including first clamping member 102 and second clamping member 104 biased together. In this example the first clamping member 102 is represented as the upper clamping member and the second clamping member 104 is shown as a lower clamping member opposite the first clamping member. A lateral projection 109 extends on both sides of clamping members 102 and 104. Lateral projection 109 includes a plurality of openings or holes 112 sized and configured to facilitate passage of respective fasteners therethrough. The clamping members, when fastened together by fasteners 110, are preferably biased together and form a central channel 114 as shown in FIGS. 8 and 9.

Figure 5:
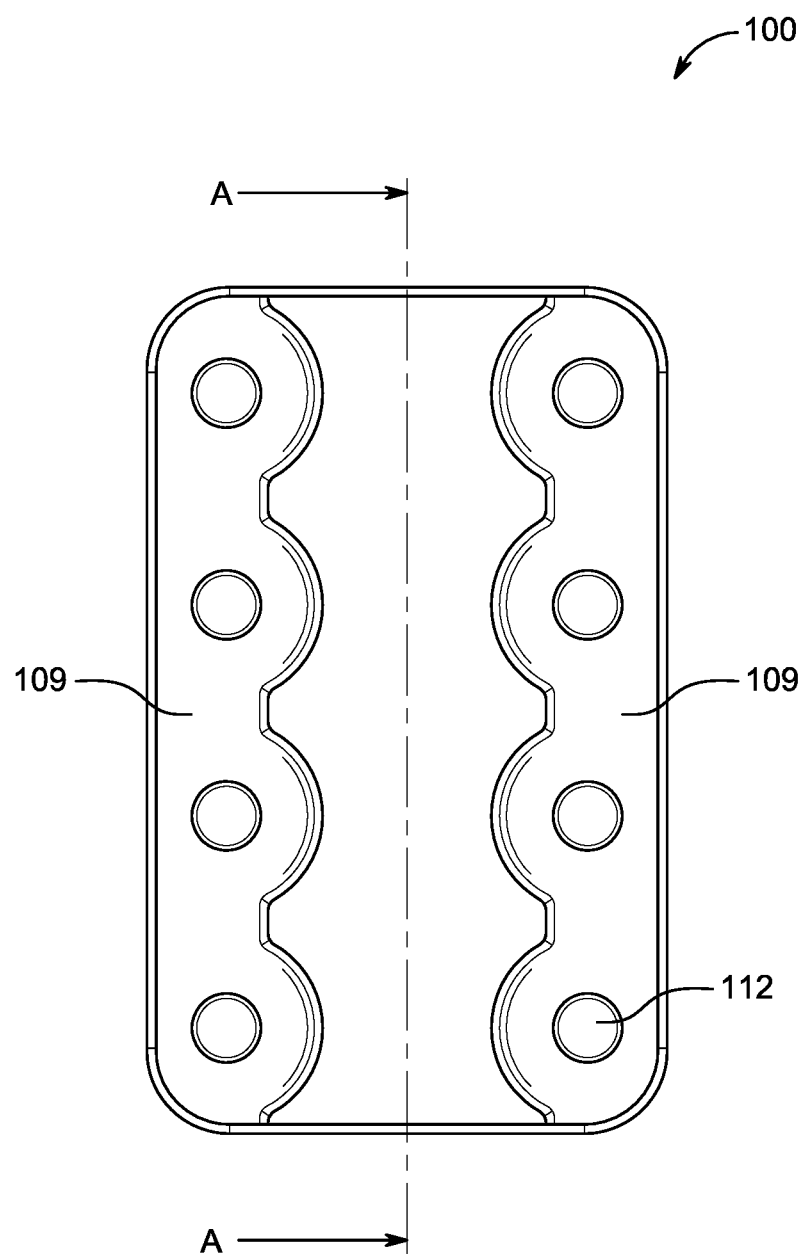
FIG. 5 is a top view of the lower clamping member of FIG. 1.

Referring to FIGS. 1 and 5, upper and lower clamping members 102, 104, when in an engaged orientation, include opposed inner wall portions which form a longitudinal groove 108. Longitudinal groove 108 seals the hose as a hard seal in a longitudinal direction. When present, the longitudinal groove provides one or more advantages. A first exemplary advantage is that the hard seal is, compared to soft seals, not a replaceable part. It does not require additional manufacturing steps or additional sealing materials and it may not lose its sealing capacity. A loose soft seal might require replacement after being used. Further, the external coating layer of a hose, frequently made of a kind of deformable rubber fabric, may be crimped or squeezed into the groove formed by the two clamping members. This advantageously forms an additional seal for inhibiting leakage.

Figure 6:
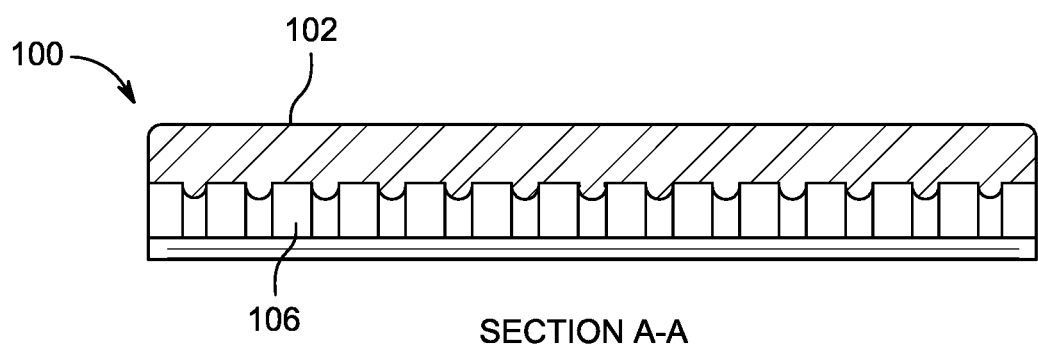
FIG. 6 shows a partial longitudinal cross sectional view taken along line A-A of the lower clamping member shown in FIG. 5.

As shown in FIGS. 5 to 6, the hose repair system is preferably configured to accommodate a standard hose size. It will be appreciated that the hose repair system may be manufactured in a variety of diameters to accommodate a diameter of a desired hose in need of repair, joinder, or extension. It will be further appreciated that the hose repair system may be manufactured from a variety of different materials to suit a desired need or situation.

As is shown in FIGS. 8 to 11, the diameter of channel 114 formed by the clamping members is preferably precisely balanced. If the diameter is chosen too big compared to the standard diameter size of a hose, then the leakage may not be fixed. On the other hand, if the diameter size of the channel is too small compared to the hose diameter, the liquid pressure may create a pile up before the mounted clamping members. This could lead to damage of the hose or of the system which provides the pressurized liquid.

With reference to FIGS. 2 and 8 to 11, the clamping members each have an inner side and an outer side. The inner side of each clamping member includes a plurality of concentric ribs 106. In this exemplary embodiment, ribs 106 are carved equaldistantly into the inner surface of each clamping member. Ribs 106 seal and stabilize the hose in a longitudinal direction. This configuration functions similar to an external skeleton to the hose, stabilizing to help prevent physical damage and maintain the integrity of the material of the hose. Ribs 106 help ensure that the hose repair system remains fixed in position rather than moving along the length of the hose. Typically, leaking water, and eventually gravity, tend to create a sliding environment relative to the hose repair system. Ribs 106, when present, may inhibit movement of the system along the hose length. Other means preventing a sliding movement may be alternatively used, for example only, circular spikes or other projections anchoring into the external material of the hose.

Figure 11:
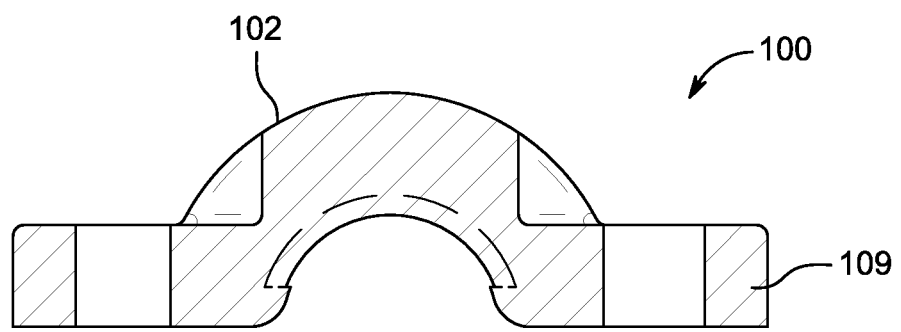
FIG. 11 is an end cross sectional view of the upper clamping member taken along line B-B of FIG. 10.

Referring now to FIGS. 9 and 11, the depth of ribs 106 and a circular arc forming each rib is shown. As previously described above, the inner diameter of the channel is preferably matched to the outer diameter of a hose with which the hose repair system may be used. Also, the shape and depth of the ribs are taken into account. Accordingly, different shapes like, for example, triangular or square configurations, and different depths provide alternative forms of the described exemplary embodiment.

As shown in FIGS. 1 and 8, system 100 preferably includes a fastening means in the form of a plurality of fasteners 110, for example, a plurality of bolts. Bolts 110 are sized and configured to extend through bores 112 (shown in FIG. 2) in both clamping members. It will be appreciated that other types of fastening means or fasteners may be used without departing from the scope of the present disclosure.

Figure 4:
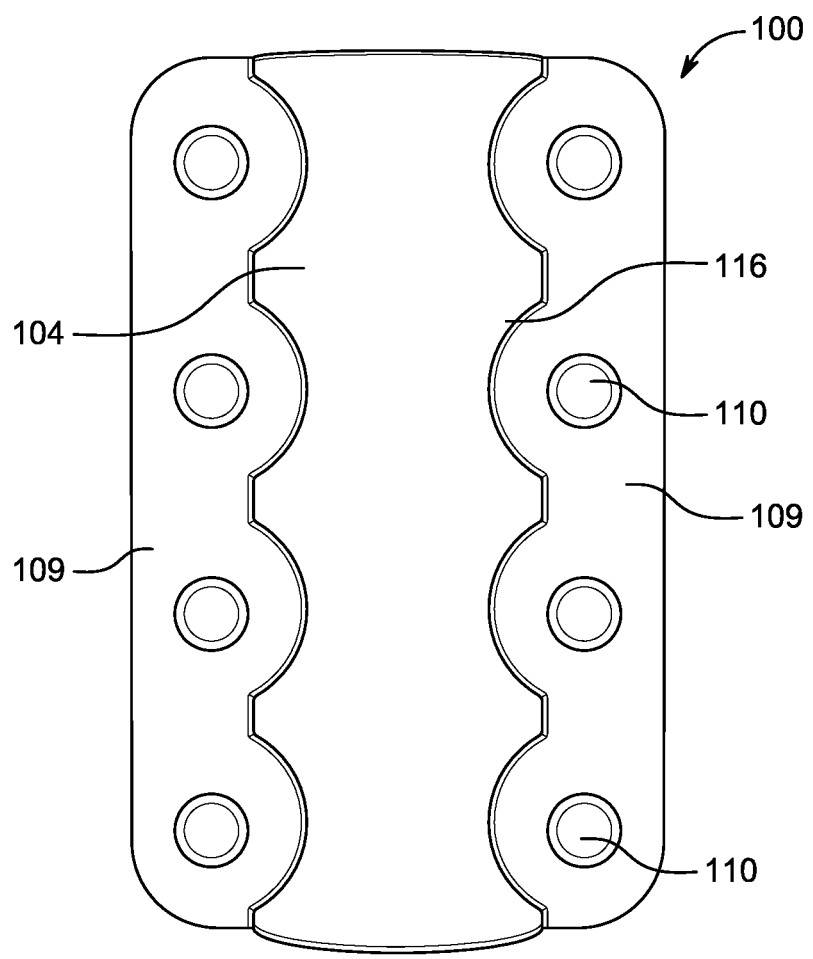
FIG. 4 is a top view of the lower clamping member of the hose repair system of FIG. 1.
Figure 7:
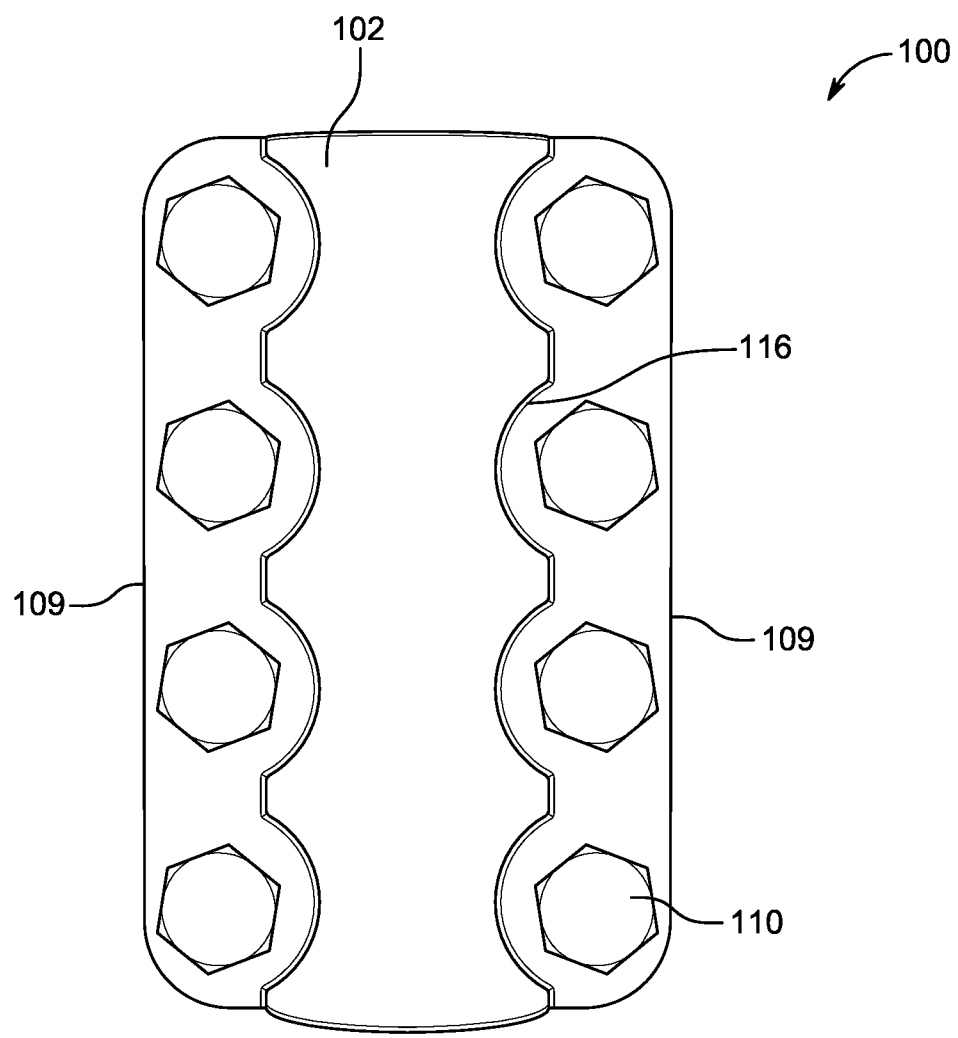
FIG. 7 is a top view of the upper clamping member shown in FIG. 1.

Referring again to FIGS. 1 and 8, hose repair system 100 has a main body portion having a cylindrical shape with lateral projections 109 extending from each side in a horizontal plane. Fastening members 110 are insertable into bores 112 along the length of each lateral projection 109. As shown in FIGS. 4 and 7, the hose repair system preferably has a rectangular shape as seen from above or below. Other forms and shapes are possible as would be appreciated by those of ordinary skill in the art.

Figure 12:
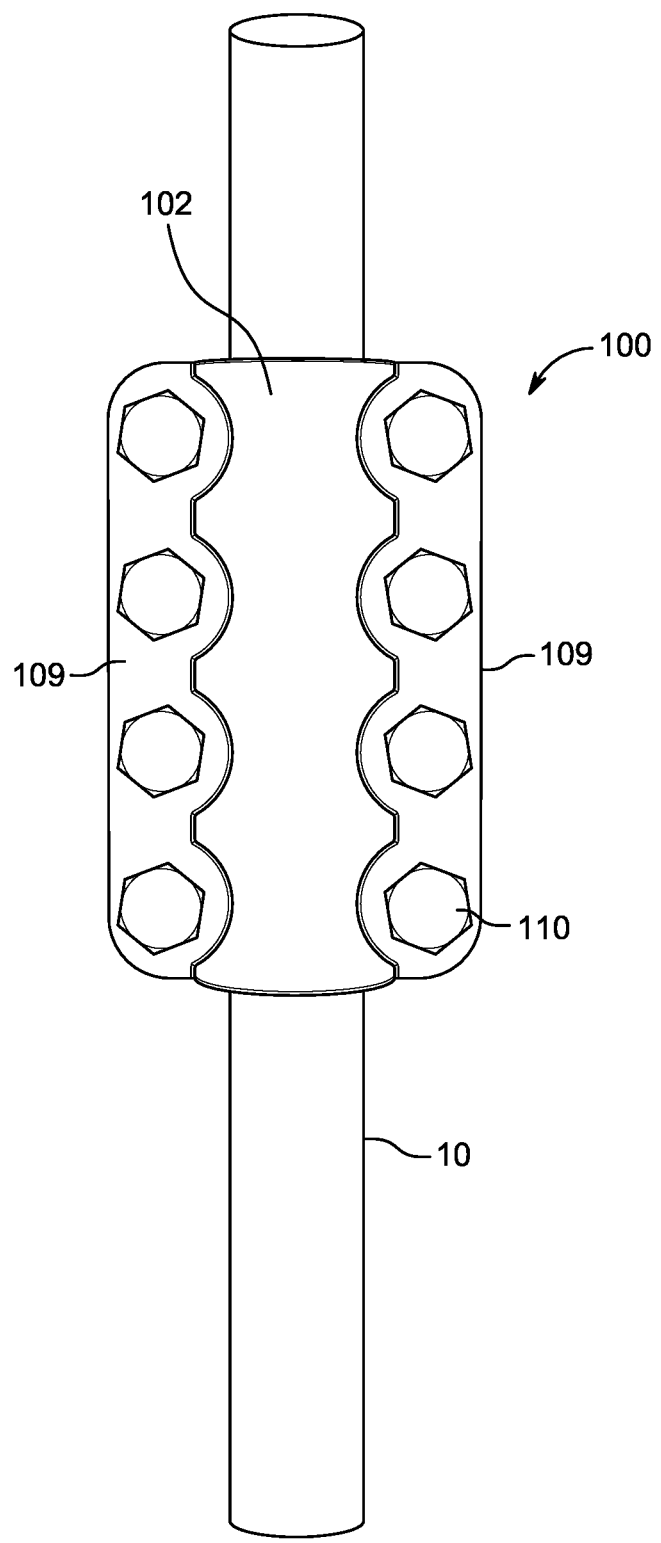
FIG. 12 is a bottom view of the upper clamping member of the hose repair system of FIG. 1 with a hose therethrough.
Figure 13:
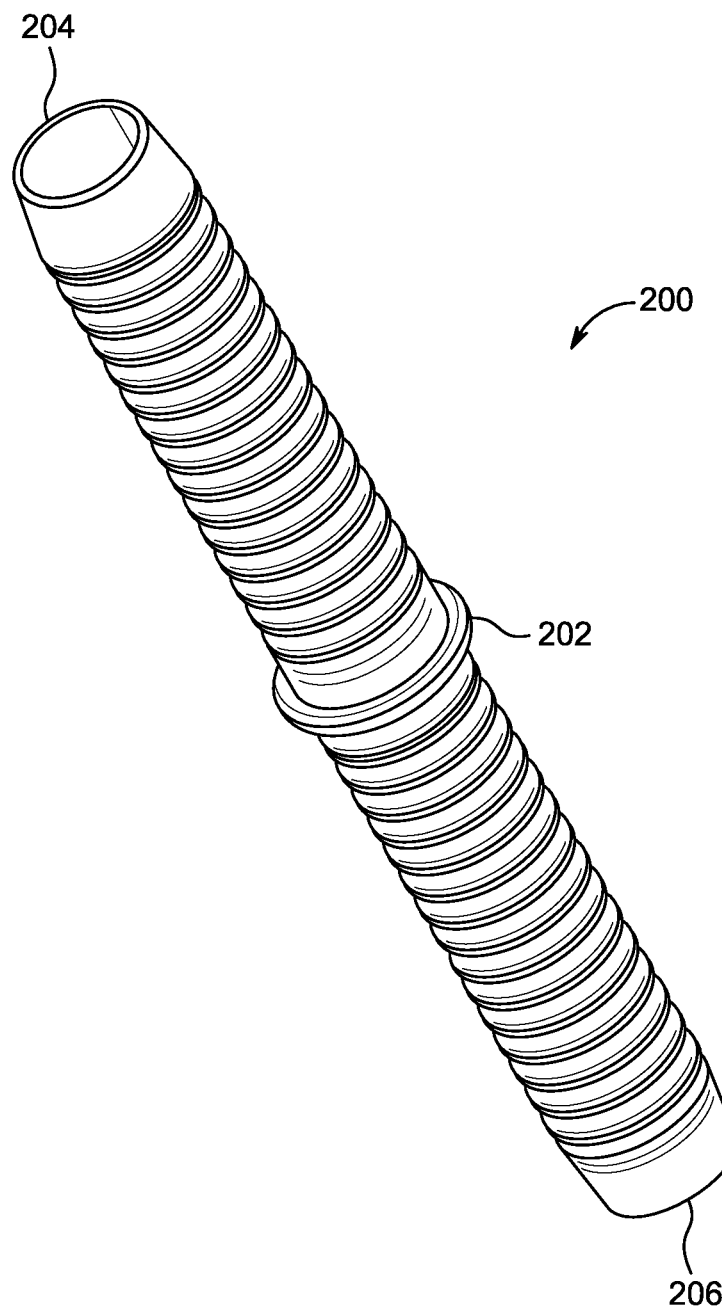
FIG. 13 is a perspective view of the barb insertable into the channel formed by the clamping members shown in FIG. 1.
Figure 14:
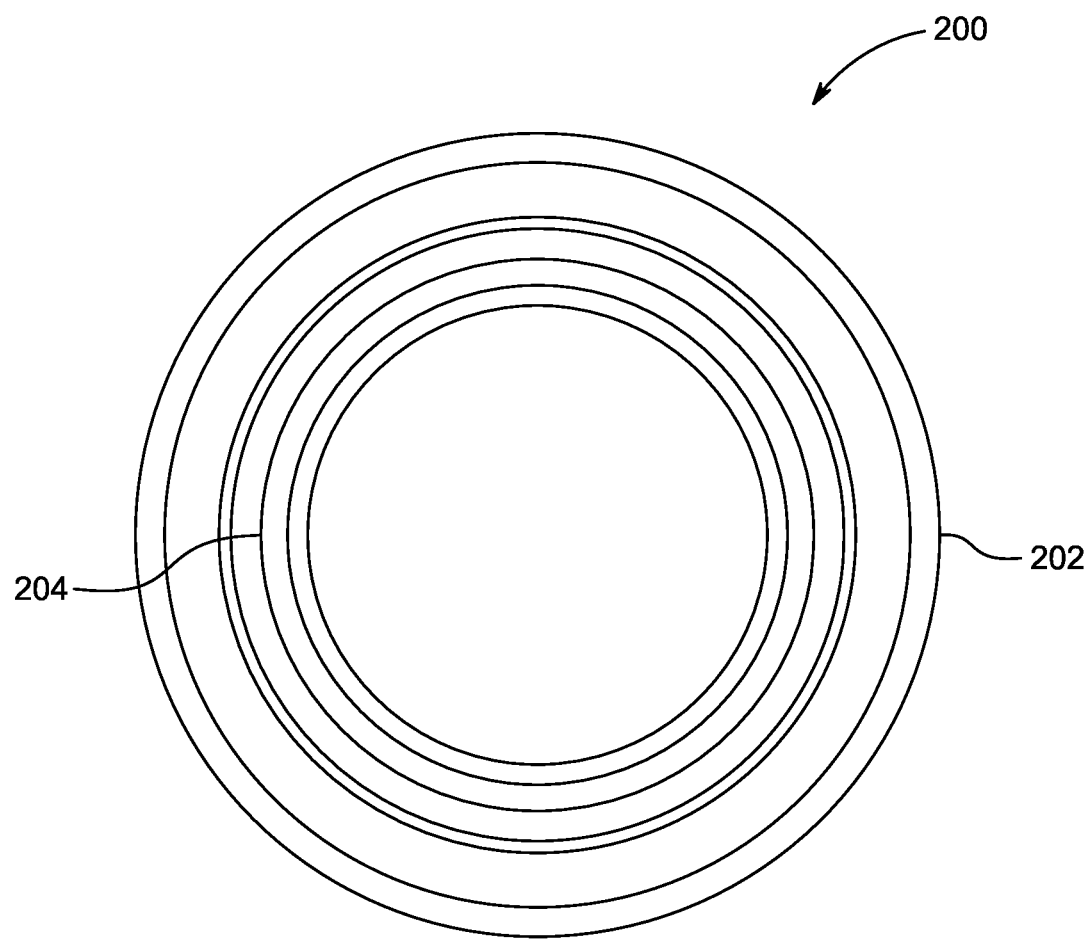
FIG. 14 is an end view of the barb of FIG. 13.

Referring now to FIG. 12, hose repair system 100 is shown mounted on a hose 10. the hose is placed in the central channel, which is formed when both clamping members are clamped together. This top view of the hose repair system shows upper clamping member 102 with exemplary bolts 110 shown inserted into respective bores along each lateral projection 109.

Figure 3:
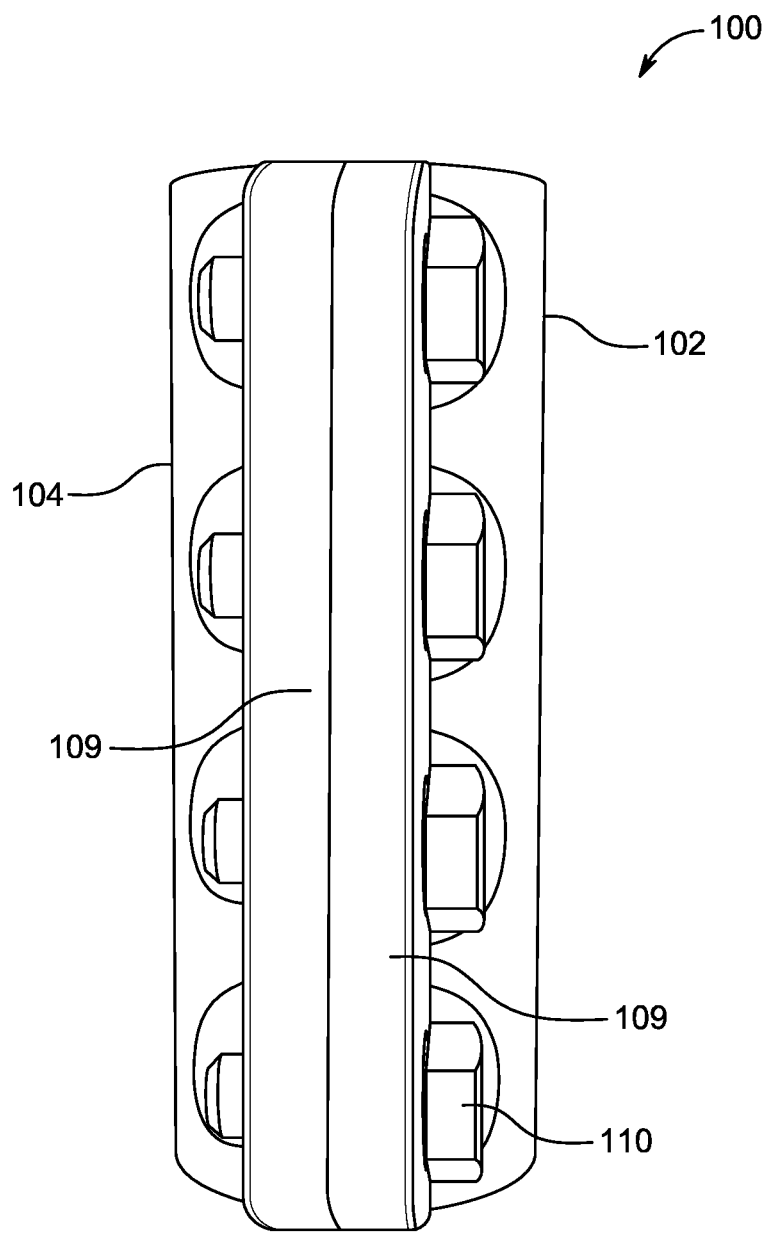
FIG. 3 is a side view of the hose repair system of FIG. 1.

Referring to FIGS. 3, 5 and 7, the external side of each clamping member is shown. As can be seen in the figures, the central cylindrical core has semi-circular recesses 116 cut out of the central core around each bore. Providing free space around the bores has an advantage in that a plurality of screwing tools may be used for screwing the bolts into threads provided in the internal walls of the bores. It will be appreciated that a variety of different bolts may be used to fasten, secure and clamp together the clamping members. If desired, high forces can be applied with fastener tools to fasten the clamping members together. A strong biasing or clamping force squeezes the hose into grooves 108 and ribs 106.

Notably, the concepts herein have been discussed in connection with conventional hoses. However, they are not so limited. For example, the same system could be applied or adapted to other hose types as well as other apparatus using high pressure liquid conduits.

Alternative embodiments can have different shapes or forms and fastening means as needed for particular situations. As an example, a clamping member may have a globular overall form, advantageous for small spaces and adapted to puncture leakages. In some circumstances, the fastening means may be configured to resiliently bias the clamping members together, for example only, through a spring clip, or a non-planar washer oriented below the head of each bolt to facilitate variable compression of the hose.

Referring to FIGS. 13 to 17, the hose repair system may include a barb 200. The barb has a hollow tubular form with a length and opposed ends 204 and 206. In this example, barb 200 has a circumferential raised portion 202 in the median area of the barb, approximately half-way along the length. The size (length and diameter) of the barb is fitted to the internal diameter of a standard hose size. Barb 200 includes a through-channel configured to permit the flow of a liquid therethrough when two ends of a hose are joined together.

Figure 15:
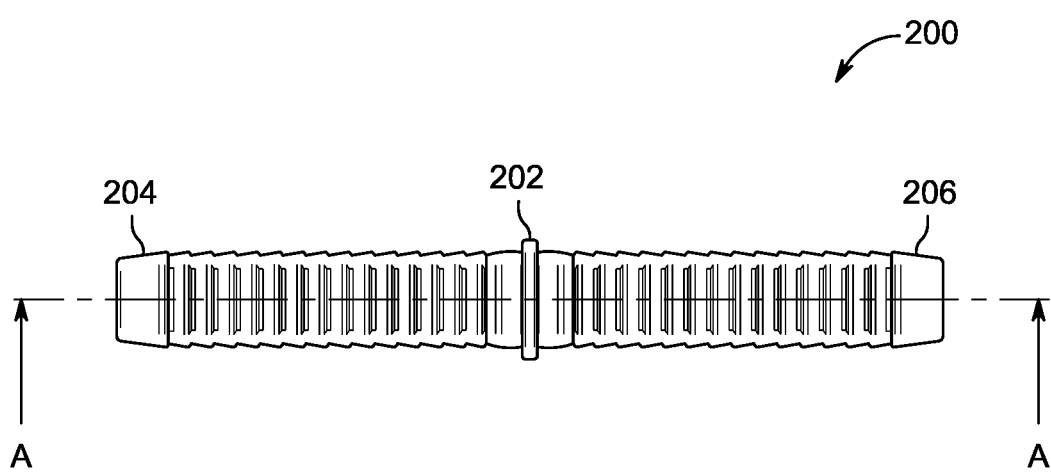
FIG. 15 is a side elevation view of the barb of FIG. 13.
Figure 16:
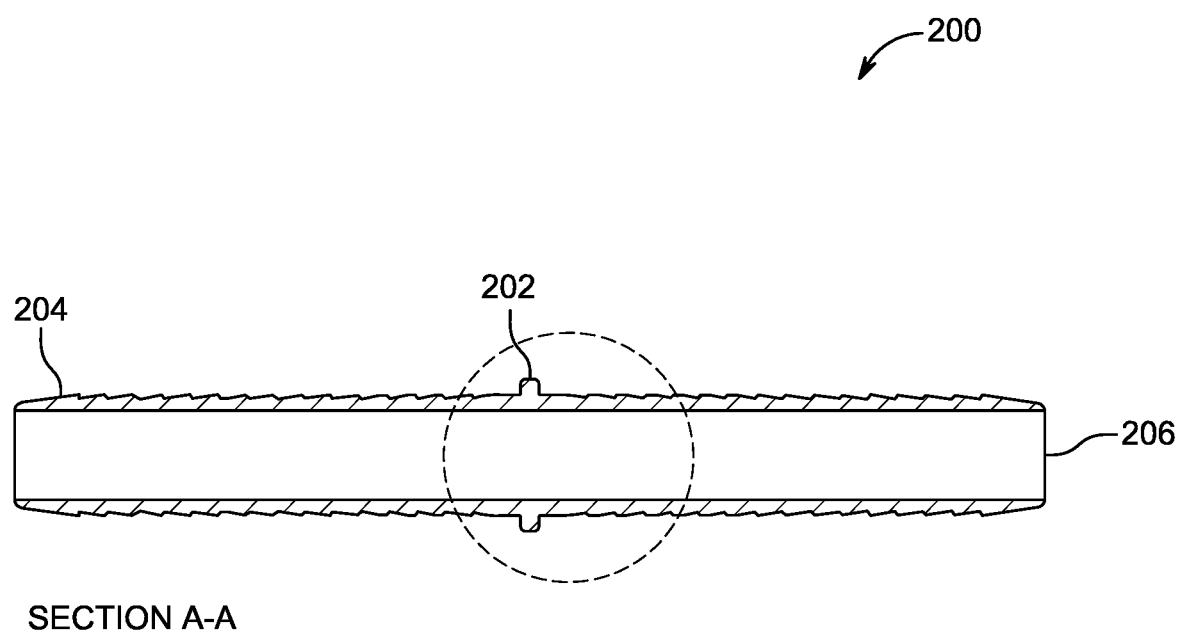
FIG. 16 is a side cross sectional view of the barb of FIG. 13 taken along line A-A of FIG. 15.
Figure 17:
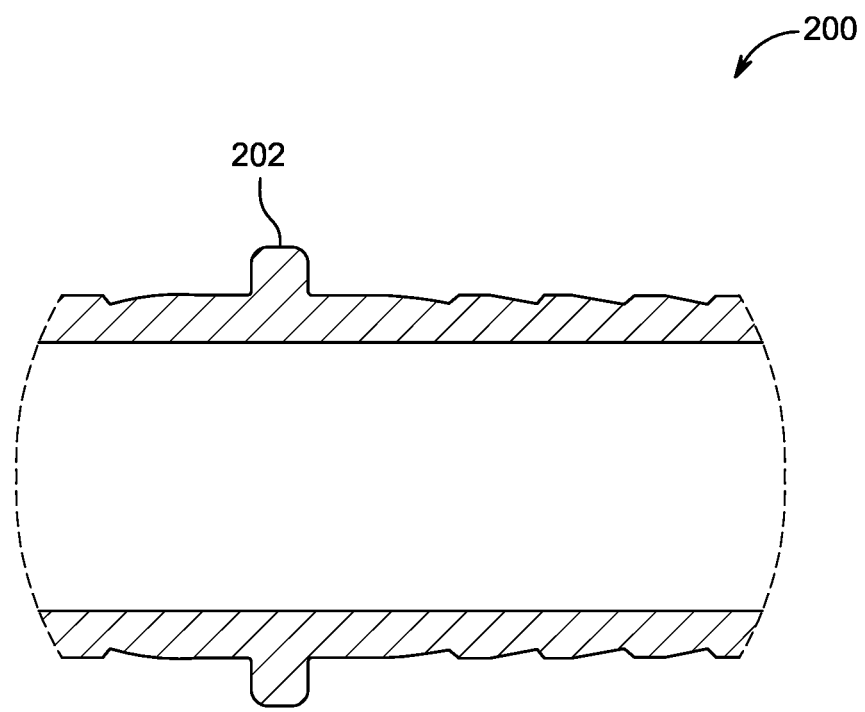
FIG. 17 is an expanded partial cross sectional of the barb of FIG. 13 taken along line B-B of FIG. 15.

Barb 200 may be introduced into a hose and stopped when the hose reaches raised portion 202, which functions as a depth-limiting stop. From the other side of the barb, another hose can be pulled over the barb until encountering raised portion 202. Using this configuration, two different hose ends may be joined. As shown in FIG. 15, barb 200 preferably has a plurality of ribs ensuring a better grip of the hose. Alternatively, rough surfaces, spikes or any other means providing a better grip or friction fit may be used as desired.

Clamping members 102, 104 are positioned and clamped around the hoses joined by barb 200. In this manner, a damaged part of a hose can be cut out and the loose parts of the hose joined again, or two independent hoses joined together. The clamping members provide a degree of stability, for example, the hose may not slip away from the barb when engaged thereto.

In one or more previously described examples, the hose repair system provides a solution for repairing or joining hoses. One or more components of the hose repair system may be made from a metallic material, either wholly or in part. Other materials are also possible, for example only, plastic, carbon fibre, and/or a rubberised material depending upon the desired application, hose type, and/or liquid pressure. As an example, a corrosive liquid leakage may be better sealed with a hose repair system which is made from a material that is non-reacting with the leaking liquid. Another example would be if the hose repair kit needed to be bendable or slightly deformable. In such a case, a hard rubber material may be more appropriate.

The hose repair system may be used in a variety of ways to repair or join hoses. In one example, both clamping members are positioned around a leaking portion of a hose and biased together around the leaking part by means of one or more fastening members.

An alternative method is to cut the damaged part out of the hose and join the hose ends with the above-described barb before positioning the clamping members around the barb. The barb provides a method for shortening hoses, or joining two hoses and may extend the overall length of the hose. It will be appreciated that two hose portions may be joined without the barb if desired. Alternatively, a barb may be used having a plurality of exterior ribs of uniform diameter without a central annular raised rib or depth stop. In some situations, the barb may be used without the clamping members, for example, in a low pressure hose environment. Alternatively, the barb may be used with clamping rings on either side of the annular depth-stop. As a further alternative, the clamping members may each have a partial annular recess configured to receive a portion of the annular depth stop of the barb therethrough. The annular depth stop may include ratchetings along its surface to engage the sides of the recess to facilitate one-way progressive compression of each hose portion between the barb and each clamping member.

While this specification contains many details, these should not be construed as limitation on the scope of what may be claimed, but rather as a description of features specific to particular examples. Certain features that are described in the specification in the context of separate implementations can also be combined. Conversely, various features that are described in the context of a single implementations can also be implemented in multiple embodiments separately or in any suitable sub-combination.

A number of examples have been described. Nevertheless, it will be understood that various modifications can be made. Accordingly, other implementations are within the scope of the following claims.

What is claimed is:

1. A hose repair system, comprising:
    a first clamping member and a second clamping member, each of said first and second clamping members including:
    a first end and a second end opposite said first end;
    a length from said first end to said second end;
    a width transverse to the length;
    an exterior surface from said first end to said second end;
    an interior surface from said first end to said second end, said interior surface including a concave curve along the width, the concave curves of said first and second clamping members forming a channel along the lengths of said first and second clamping members when said clamping members are clamped together, said channel including a pair of longitudinal grooves formed at the intersection of said first and second clamping members, each longitudinal groove extending from end to end of each clamping member, each longitudinal groove having opposed wall portions extending into the channel; and
    at least one fastener for clamping said first and second clamping members together, wherein said interior surface of each clamping member includes a plurality of ribs, each rib being oriented transverse to the length of each clamping member, said wall portions and said ribs each have a height, the height of said wall portions being greater than the height of said ribs.

2. The hose repair system of claim 1, wherein said wall portions of each longitudinal groove are continuous along the entire length of each clamping member.

3. The hose repair system of claim 1, wherein each clamping member includes an abutment surface on both sides of each clamping member, said abutment surfaces of said first and second clamping members being configured to abut one another when said first and second clamping members are clamped together.

4. The hose repair system of claim 1, wherein said longitudinal grooves are directly opposite one another in a plane transverse to the length of the clamping members.

5. The hose repair system of claim 1, wherein said wall portions of said longitudinal grooves extending into the channel form sharp edges with said ribs.

6. The hose repair system of claim 1, where said at least one fastener includes a plurality of bolts.

7. The hose repair system of claim 1, wherein said at least one fastener includes a resilient clamp configured to slide over the exterior surfaces of said first and second clamping members to bias said first and second clamping members towards one another.

8. The hose repair system of claim 1, where on said exterior surface each of said clamping members includes a plurality of recesses for providing access to said at least one fastener, where each fastener is a bolt.

9. The hose repair system of claim 1, wherein said first and second clamping members are metallic.

10. The hose repair system of claim 1, said system consisting of a metal.

11. The hose repair system of claim 1, wherein said channel is the only channel extending along the length of said first and second clamping members when said first and second clamping members are clamped together.

12. The hose repair system of claim 1, further comprising a projection projecting from at least one of said interior surfaces, said projection being configured to partially penetrate a surface of a hose clamped by said first and second clamping members.

13. A hose repair system comprising:
    a first clamping member and a second clamping member, each of said first and second clamping members including:
    a first end and a second end opposite said first end;
    a length from said first end to said second end;
    a width transverse to the length;
    an exterior surface from said first end to said second end;
    an interior surface from said first end to said second end, said interior surface including a concave curve along the width, the concave curves of said first and second clamping members forming a channel along the lengths of said first and second clamping members when said clamping members are clamped together, said channel including a pair of longitudinal grooves formed at the intersection of said first and second clamping members, each longitudinal groove extending from end to end of each clamping member, each longitudinal groove having opposed wall portions extending into the channel; and
    at least one fastener for clamping said first and second clamping members together, wherein said interior surface of each clamping member includes a plurality of ribs, each rib being oriented transverse to the length of each clamping member, said ribs of said first clamping member are co-planar with said ribs of said second clamping member, said co-planar ribs being interrupted by each longitudinal groove in a plane transverse to the length of each clamping member.

14. A method for assembling a hose repair system, comprising:
    cutting out a damaged portion of a hose;
    joining together two ends of the hose with a hollow tubular member;
    clamping the hose ends and hollow tubular member by positioning the hose ends and hollow tubular member between a first clamping member having a concave channel portion and a second clamping member having a concave channel portion, each clamping member having a length, wherein the concave channel portions of the first and second clamping members form a channel along the lengths of the first and second clamping members; and
    biasing said first and second clamping members towards one another with at least one fastener, wherein biasing said first and second clamping members forms a pair of longitudinal grooves at the intersection of said first and second clamping members, each longitudinal groove extending from end to end of each clamping member, and each longitudinal groove having opposed wall portions extending into the channel, wherein said wall portions of each longitudinal groove are continuous along the entire length of each clamping member.

15. The method of claim 14, wherein said at least one fastener biases said clamping members with a plurality of bolts.

16. The method of claim 15, wherein the plurality of bolts are rotatable for biasing said clamping members.

17. The method of claim 14, said at least one fastener having a resilient clamp sliding over exterior surfaces of said first and second clamping members biasing said first and second clamping members towards one another.

\* \* \* \* \*